(12) United States Patent
Oshimo et al.

(10) Patent No.: US 12,459,296 B2
(45) Date of Patent: Nov. 4, 2025

(54) TIRE

(71) Applicant: SUMITOMO RUBBER INDUSTRIES, LTD., Hyogo (JP)

(72) Inventors: Masaki Oshimo, Hyogo (JP); You Toshima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 45 days.

(21) Appl. No.: 18/015,617

(22) PCT Filed: Jul. 20, 2021

(86) PCT No.: PCT/JP2021/027181
§ 371 (c)(1),
(2) Date: Jan. 11, 2023

(87) PCT Pub. No.: WO2022/024884
PCT Pub. Date: Feb. 3, 2022

(65) Prior Publication Data
US 2023/0286325 A1    Sep. 14, 2023

(30) Foreign Application Priority Data

Jul. 29, 2020 (JP) .................... 2020-128369

(51) Int. Cl.
*B60C 11/00* (2006.01)
*B60C 1/00* (2006.01)
*B60C 11/03* (2006.01)

(52) U.S. Cl.
CPC .... *B60C 1/0016* (2013.01); *B60C 2011/0016* (2013.01); *B60C 2011/0025* (2013.01);
(Continued)

(58) Field of Classification Search
CPC ................ B60C 1/0016; B60C 2011/0346
See application file for complete search history.

(56) References Cited

U.S. PATENT DOCUMENTS

| 5,686,530 A | * | 11/1997 | Halasa | .................. B60C 1/0016 525/98 |
| 2013/0153102 A1 | * | 6/2013 | Zhao | ..................... B60C 1/0016 152/209.5 |

(Continued)

FOREIGN PATENT DOCUMENTS

| EP | 3222440 | 9/2017 |
| EP | 4015239 | 6/2022 |

(Continued)

OTHER PUBLICATIONS

Machine Translation: JP-2005220212-A, Watanabe K, (Year: 2024).*

(Continued)

*Primary Examiner* — Kendra Ly
(74) *Attorney, Agent, or Firm* — Greenblum & Bernstein, P.L.C.

(57) ABSTRACT

A tire having a tread composed of a rubber composition that includes a rubber component, wherein the tread has at least one circumferential main groove extending continuously in a tire circumferential direction, wherein, at a bending part in a plurality, the circumferential main groove bends and extends in the tire circumferential direction such that a center line of the circumferential main groove deviates in a tire width direction or an extending direction of the center line of the circumferential main groove changes preceding and following the bending part, and wherein the rubber composition has tan δ at 20° C. (20° C. tan δ) of 0.30 or less, and breaking strength TB (MPa) at 175° C. and elongation at break EB (%) at 175° C. satisfying a relational expression of TB×EB/2≥600.

18 Claims, 4 Drawing Sheets

(52) U.S. Cl.
CPC ............... *B60C 2011/0341* (2013.01); *B60C 2011/0346* (2013.01); *B60C 2011/0355* (2013.01)

(56) References Cited

U.S. PATENT DOCUMENTS

| | | | |
|---|---|---|---|
| 2014/0230982 A1* | 8/2014 | Ninomiya | B60C 11/12 152/209.22 |
| 2016/0229231 A1 | 8/2016 | Furusawa et al. | |
| 2017/0225514 A1 | 8/2017 | Iwata | |
| 2018/0327572 A1* | 11/2018 | Maekawa | C08L 7/00 |
| 2021/0002460 A1 | 1/2021 | Kojima et al. | |
| 2022/0017727 A1 | 1/2022 | Murase | |

FOREIGN PATENT DOCUMENTS

| | | |
|---|---|---|
| JP | 03-169719 | 7/1991 |
| JP | 2005220212 A * | 8/2005 |
| JP | 2007302813 A * | 11/2007 |
| JP | 2007308625 A * | 11/2007 |
| JP | 2014-180910 | 9/2014 |
| JP | 2015-016866 | 1/2015 |
| JP | 2015-164985 | 9/2015 |
| JP | 2017-136998 | 8/2017 |
| JP | 2017-165409 | 9/2017 |
| JP | 2019-099062 | 6/2019 |
| JP | 2020-006871 | 1/2020 |
| JP | 2020-097644 | 6/2020 |
| WO | 2015/041179 | 3/2015 |

OTHER PUBLICATIONS

Machine Translation: JP-2007302813-A, Muraki T, (Year: 2024).*
Machine Translation: JP-2007308625-A, Imoto Y, (Year: 2024).*
International Search Report issued in International Pat. Appl. No. PCT/JP2021/027181, dated Oct. 19, 2021, along with an English translation thereof.
International Preliminary Report on Patentability issued in International Pat. Appl. No. PCT/JP2021/027181, dated Jan. 31, 2023, along with an English translation thereof.
Extended European Search Report Issued in Corresponding EP Patent Application No. 21850567.5, dated Aug. 19, 2024.

* cited by examiner

TIRE

TECHNICAL FIELD

The disclosure relates to a tire having an improved chipping resistance when traveling on a bad road at a high speed.

BACKGROUND ART

While a tread pattern having a zigzag-shaped circumferential main groove is often adopted for a tread part of a truck, an SUV, and the like traveling on a bad road from a viewpoint of securing steering stability, damage in which a scratch formed in a tread expands to produce a small chip (chip cutting), and the like tends to occur, so that it is necessary to secure durability against chip cutting (chipping resistance).

Patent document 1 discloses that, with a tire comprising a tread rubber in which are compounded a rubber component and carbon black, which rubber component comprises a butadiene rubber and a natural rubber, abrasion resistance and cutting resistance are improved.

PRIOR ART DOCUMENT

Patent Document

Patent Document 1: JP 2015-164985 A

SUMMARY OF THE INVENTION

Problem to be Solved by the Invention

However, there is a problem that the heat generation property increases with an increase in a compounding amount of carbon black.

An object of the disclosure is to provide a tire having an improved chipping resistance when traveling on a bad road at a high speed.

Means to Solve the Problem

As a result of intensive studies, it has been found that, in a tire comprising a tread part comprising a circumferential main groove having a bending part, chipping resistance of the tire when it travels on a bad road at a high speed is improved by making loss tangent tan δ, breaking strength, and elongation at break of a rubber composition forming a tread to be within a predetermined range.

In other words, the disclosure relates to a tire comprising a tread composed of a rubber composition comprising a rubber component, wherein the tread has a circumferential main groove extending continuously in a tire circumferential direction, the circumferential main groove being in one or a plurality, wherein, at a bending part in a plurality, the circumferential main groove bends and extends in the tire circumferential direction such that a center line of the circumferential main groove deviates in a tire width direction or an extending direction of the center line of the circumferential main groove changes preceding and following the bending part, and wherein the rubber composition has tan δ at 20° C. (20° C. tan δ) of 0.30 or less, and breaking strength TB (MPa) at 175° C. and elongation at break EB (%) at 175° C. satisfying a relational expression of TB×EB/2≥600.

Effects of the Invention

The disclosure makes it possible to obtain a tire having an improved chipping resistance when traveling on a bad road at a high speed by making tan δ, breaking strength, and elongation at break of a rubber composition forming a tread to be within a predetermined range even in a tire comprising a tread part in which tread part chip cutting tends to occur, which tread part comprises a circumferential main groove having a bending part.

EMBODIMENT FOR CARRYING OUT THE INVENTION

Figure 1:
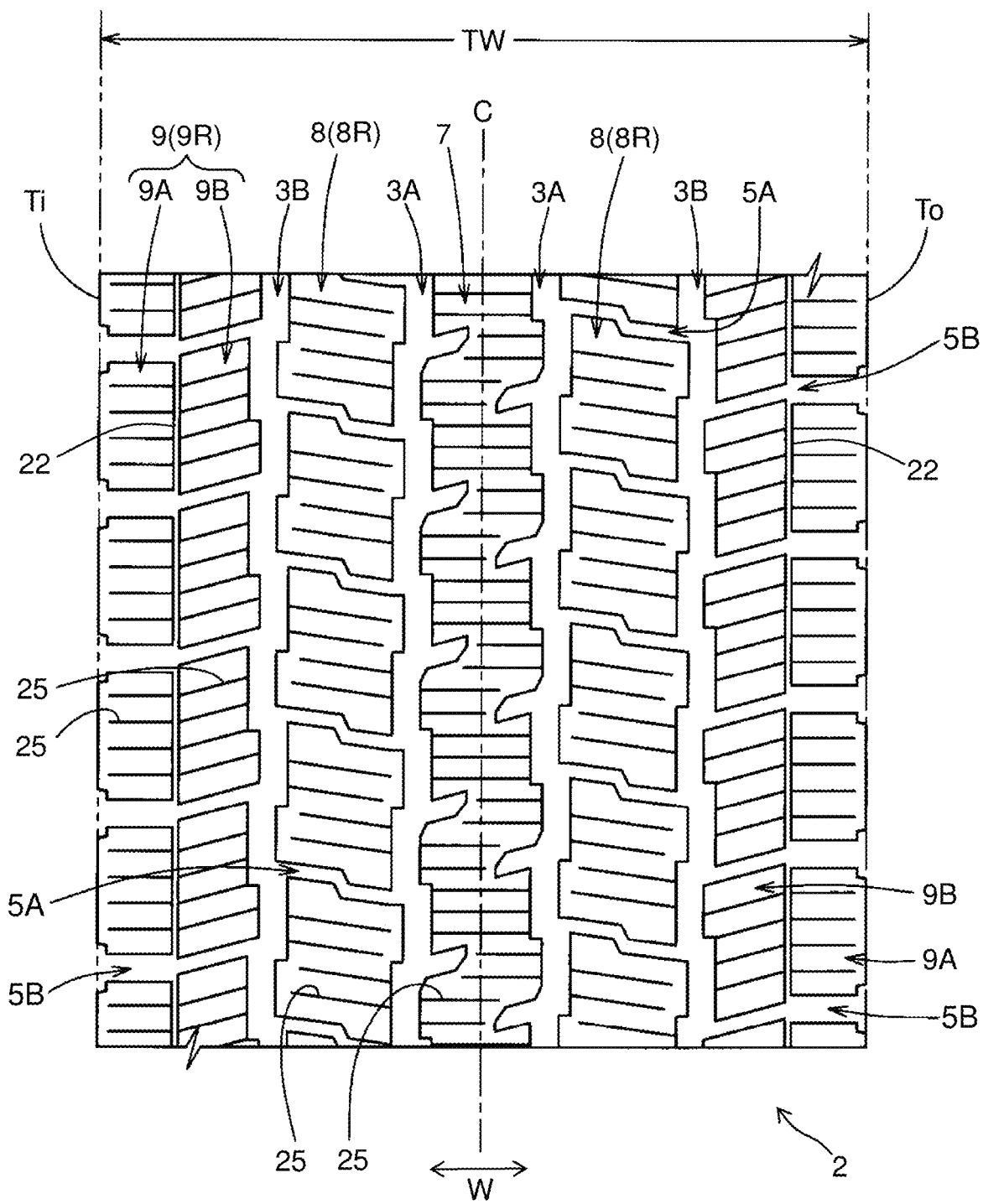
FIG. 1 is a partial cross-sectional view showing a tread pattern of a tire of the disclosure.

A tire according to one embodiment of the disclosure is a tire comprising a tread composed of a rubber composition comprising a rubber component, wherein the tread has a circumferential main groove extending continuously in a tire circumferential direction, the circumferential main groove being in one or a plurality, wherein, at a bending part in a plurality, the circumferential main groove bends and extends in the tire circumferential direction such that a center line of the circumferential main groove deviates in a tire width direction or an extending direction of the center line of the circumferential main groove changes preceding and following the bending part, and wherein the rubber composition has tan δ at 20° C. (20° C. tan δ) of 0.30 or less (preferably 0.25 or less, more preferably 0.20 or less, and further preferably 0.18 or less), and breaking strength TB (MPa) at 175° C. and elongation at break EB (%) at 175° C. satisfying a relational expression of TB×EB/2≥600 (preferably TB×EB/2≥625 and more preferably TB×EB/2≥650).

Although it is not intended to be bound by theory, the following can be considered as a reason that the tire of the disclosure is superior in chipping resistance when traveling on a bad road at a high speed: A tire comprising a circumferential main groove having a bending part traveling on a bad road causes a foreign matter such as a pebble to be prevented from getting off the main groove. When it travels at a high speed in such a state, a tread rubber surface near the foreign matter is fixed by the foreign matter, causing an instantaneously strong force to be applied to the tread rubber surface at the time of grounding and causing the tread rubber surface to increase to a high temperature. On the other hand, an inner part of a tread rubber is not likely to be affected by the foreign matter, so that it generates heat and softens in the same manner as when the tire travels at a normal speed. As a result of the above, change and an instantaneous difference in stress occur between the surface and the inner part of the tread rubber, causing an occurrence of chipping to be more likely. Then, chipping resistance is improved synergistically by increasing the tensile properties of the tread rubber at a high temperature and decreasing the heat generation property at a normal temperature.

A production procedure of a tire comprising a rubber composition for a tread according to one embodiment of the disclosure will be described in detail below. Note that recitations below are exemplary for describing the disclosure, so that they are not intended to limit the technical scope of the disclosure to the range of the above-mentioned recitations. Besides, a numerical range indicated using the recitation "to" in the specification is to comprise numerical values at both ends thereof.

[Rubber Composition for Tread]

As described above, a rubber composition forming a tread (a rubber composition for a tread) comprises a rubber component.

The rubber composition for the tread according to the disclosure preferably comprises (preferably 25 parts by mass or more, more preferably 35 to 120 parts by mass, further preferably 50 to 100 parts by mass, and particularly preferably 60 to 90 parts by mass of) silica, which silica has an average particle diameter of 17 nm or less, (preferably 16 nm or less, and more preferably 15 nm or less).

The rubber composition for the tread according to the disclosure comprises, in a rubber component, preferably 10% by mass or more of an isoprene-based rubber; more preferably 10% by mass or more of the isoprene-based rubber and 20% by mass or more of a styrene-butadiene rubber; further preferably 10 to 80% by mass of the isoprene-based rubber and 20 to 80% by mass of the styrene-butadiene rubber; further preferably 12 to 75% by mass of the isoprene-based rubber and 25 to 75% by mass of the styrene-butadiene rubber; and particularly preferably 15 to 70% by mass of the isoprene-based rubber and 30 to 70% by mass of the styrene-butadiene rubber.

<Rubber Component>

The rubber composition for the tread according to the disclosure comprises, as a rubber component, preferably an isoprene-based rubber, and more preferably an isoprene-based rubber and at least one selected from the group consisting of a styrene-butadiene rubber (SBR) and a butadiene rubber (BR). The rubber component can be a rubber component comprising an isoprene-based rubber, a SBR, and a BR, can be a rubber component only consisting of an isoprene-based rubber, a SBR, and a BR, or can be a rubber component only consisting of an isoprene-based rubber and a SBR.

(Isoprene-Based Rubber)

As isoprene-based rubbers, those common in the tire industry such as an isoprene rubber (IR), a natural rubber, and the like can be used, for example. In the natural rubber, in addition to a non-modified natural rubber (NR), an epoxidized natural rubber (ENR), a hydrogenated natural rubber (HNR), a deproteinized natural rubber (DPNR), an ultra pure natural rubber, a modified natural rubber including a grafted natural rubber, etc., and the like are also included. These isoprene-based rubbers may be used alone or two or more thereof may be used in combination.

The NR is not particularly limited, so that, as the NR, those common in the tire industry, such as, for example, SIR20, RSS #3, TSR20, etc., can be used.

When the rubber composition comprises the isoprene-based rubber, the content thereof in the rubber component is, from a viewpoint of chipping resistance (TB and EB), preferably 10% by mass or more, more preferably 12% by mass or more, and further preferably 15% by mass or more. On the other hand, from a viewpoint of wet grip performance, it is preferably 80% by mass or less, more preferably 75% by mass or less, further preferably 70% by mass or less, and particularly preferably 65% by mass or less.

(SBR)

The SBR is not particularly limited, and examples thereof include a solution-polymerized SBR (S-SBR), an emulsion-polymerized SBR (E-SBR), modified SBRs thereof (a modified S-SBR, a modified E-SBR), and the like. Examples of the modified SBR include an SBR modified at its terminal and/or main chain, a modified SBR coupled with tin, a silicon compound, etc. (a modified SBR of condensate or having a branched structure, etc.), and the like. Among them, an E-SBR is preferable from a viewpoint that the heat generation property and abrasion resistance can be satisfactorily improved. These SBRs may be used alone or two or more thereof may be used in combination.

A styrene content of the SBR is, from viewpoints of wet grip performance and abrasion resistance, preferably 5% by mass or more, more preferably 15% by mass or more, and further preferably 20% by mass or more. Moreover, from viewpoints of temperature dependence of grip performance, and abrasion resistance, it is preferably 60% by mass or less, and further preferably 50% by mass or less. Besides, in the specification, the styrene content of the SBR is calculated by $^1$H-NMR measurement.

A vinyl content of the SBR is preferably 10 mol % or more, more preferably 13 mol % or more, and further preferably 16 mol % or more, from viewpoints of ensuring reactivity with silica, rubber strength, and abrasion resistance. Moreover, the vinyl content of the SBR is preferably 70 mol % or less, more preferably 65 mol % or less, and further preferably 60 mol % or less, from viewpoints of preventing temperature dependence from increasing, wet grip performance, elongation at break, and abrasion resistance. Besides, in the specification, the vinyl content (1,2-bond butadiene unit amount) of the SBR is measured by infrared absorption spectrometry.

A weight-average molecular weight (Mw) of the SBR is preferably 150,000 or more, more preferably 200,000 or more, and further preferably 250,000 or more, from a viewpoint of abrasion resistance. Moreover, the Mw is preferably 2,500,000 or less and more preferably 2,000,000 or less, from viewpoints of cross-linking uniformity and the like. Besides, the Mw can be calculated in terms of a standard polystyrene based on measurement values obtained by a gel permeation chromatography (GPC) (for example, GPC-8000 Series, manufactured by Tosoh Corporation, Detector: differential refractometer, Column: TSKGEL SUPERMULTIPORE HZ-M, manufactured by Tosoh Corporation).

When the rubber composition comprises the SBR, the content thereof in the rubber component is, from a viewpoint of chipping resistance (TB and EB), preferably 20% by mass or more, more preferably 25% by mass or more, further preferably 30% by mass or more, and particularly preferably 35% by mass or more. Moreover, from a viewpoint of abrasion resistance, it is preferably 80% by mass or less, more preferably 75% by mass or less, further preferably 70% by mass or less, and particularly preferably 65% by mass or less.

(BR)

The BR is not particularly limited, and those commonly used in the tire industry can be used, such as, for example, a BR having a cis content (cis-1,4-bond butadiene unit amount) of less than 50% (a low cis BR), a BR having a cis content of 90% or more (a high cis BR), a rare earth-based butadiene rubber synthesized using a rare earth element-based catalyst (a rare earth-based BR), a BR containing a syndiotactic polybutadiene crystal (an SPB-containing BR), a modified BR (a high cis modified BR, a low cis modified BR), and the like. As these BRs, those commercially available from Ube Industries, Ltd., Sumitomo Chemical Co., Ltd., JSR Corporation, LANXESS, etc. can be used. These BRs may be used alone or two or more thereof may be used in combination.

As the rare earth-based BRs, those commonly used in the tire industry can be used. As rare earth element-based catalysts for use in synthesis (polymerization) of the rare earth-based BR, those which are known can be used, and examples thereof include, for example, a lanthanum series rare earth element compound, an organoaluminum compound, aluminoxane, a halogen-containing compound and, as needed, a catalyst comprising a Lewis base. Among them, from a viewpoint that the BR having a high cis content and a low vinyl content is obtained, the rare earth element-based catalyst is preferably a neodymium (Nd)-based catalyst using a neodymium-containing compound as the lanthanum series rare earth element compound.

Examples of the SPB-containing BR include those in which a 1,2-syndiotactic polybutadiene crystal is chemically bonded with the BR and dispersed, but not those in which the crystal is simply dispersed in the BR.

Examples of the modified BRs include those obtained by polymerizing 1,3-butadiene with a lithium initiator and then adding a tin compound and in which a modified BR molecule is bonded by a tin-carbon bond at its terminal (a tin-modified BR), a butadiene rubber having an alkoxysilane condensate compound at the active terminal of the butadiene rubber (a modified BR for silica), and the like.

A weight-average molecular weight (Mw) of the BR is preferably 300,000 or more, more preferably 350,000 or more, and further preferably 400,000 or more, from viewpoints of abrasion resistance, grip performance, and the like. Moreover, it is preferably 2,000,000 or less, and more preferably 1,000,000 or less, from viewpoints of cross-linking uniformity and the like. Besides, the Mw can be determined in terms of a standard polystyrene based on measurement values obtained by a gel permeation chromatography (GPC) (for example, GPC-8000 Series, manufactured by Tosoh Corporation, Detector: differential refractometer, Column: TSKGEL SUPERMULTIPORE HZ-M, manufactured by Tosoh Corporation).

When the rubber composition comprises the BR, the content thereof in the rubber component is, from a viewpoint of abrasion resistance, preferably 5% by mass or more, more preferably 10% by mass or more, further preferably 20% by mass or more, and particularly preferably 30% by mass or more. Moreover, from a viewpoint of wet grip performance, it is preferably 60% by mass or less, more preferably 55% by mass or less, further preferably 50% by mass or less, and particularly preferably 45% by mass or less.

(Other Rubber Components)

The rubber component according to the disclosure can include rubber components other than the previously-described isoprene-based rubbers, SBRs, and BRs. As other rubber components, a cross-linkable rubber component commonly used in the tire industry can be used, such as, for example, a styrene-isoprene-butadiene copolymer rubber (SIBR), a styrene-isobutylene-styrene block copolymer (SIBS), a chloroprene rubber (CR), an acrylonitrile-butadiene rubber (NBR), a hydrogenated nitrile rubber (HNBR), a butyl rubber (IIR), an ethylene propylene rubber, a polynorbornene rubber, a silicone rubber, a polyethylene chloride rubber, a fluororubber (FKM), an acrylic rubber (ACM), a hydrin rubber, and the like. These other rubber components may be used alone or two or more thereof may be used in combination.

<Filler>

The rubber composition for the tread according to the disclosure comprises, as a filler, preferably carbon black and/or silica. Moreover, a filler can be a filler only consisting of carbon black and silica.

(Silica)

Silica is not particularly limited, and, for example, those common in the tire industry can be used, such as silica prepared by a dry process (anhydrous silica), silica prepared by a wet process (hydrous silica), and the like. Among them, hydrous silica prepared by a wet process is preferable because it has many silanol groups. These silicas may be used alone or two or more thereof may be used in combination.

An average primary particle diameter of silica is preferably 19 nm or less, more preferably 18 nm or less, further preferably 17 nm or less, further preferably 16 nm or less, and particularly preferably 15 nm or less. A lower limit of the average primary particle diameter is not particularly limited, but it is preferably 1 nm or more, more preferably 3 nm or more, and further preferably 5 nm or less. Making the average primary particle diameter of silica to be within the above-mentioned range makes it possible to further improve the dispersibility of silica, so that an improvement effect of the heat generation property and chipping resistance improves. As a result, chipping resistance (TB and EB) can be improved effectively even when decreasing a compounding amount of silica and an increase in the heat generation property (20° C. tan δ) in conjunction with an increase in the compounding amount can be suppressed. Besides, the average primary particle diameter of silica can be determined by observing silica with a transmission or scanning electron microscope and measuring at least 400 primary particles of silica observed in a field of view, and taking an average thereof.

A nitrogen adsorption specific surface area ($N_2SA$) of silica is preferably 170 $m^2/g$ or more, more preferably 180 $m^2/g$ or more, further preferably 190 $m^2/g$ or more, and particularly preferably 200 $m^2/g$ or more, from viewpoints of the heat generation property (20° C. tan δ) and chipping resistance. Moreover, it is preferably 350 $m^2/g$ or less, more preferably 300 $m^2/g$ or less, and further preferably 250 $m^2/g$ or less, from a viewpoint of processability. Besides, the $N_2SA$ of silica in the specification is a value measured with a BET method in accordance with ASTM D3037-93.

A content of silica based on 100 parts by mass of the rubber component is, from a viewpoint of chipping resistance (TB and EB), preferably 25 parts by mass or more, more preferably 30 parts by mass or more, further preferably 35 parts by mass or more, further preferably 40 parts by mass or more, further preferably 45 parts by mass or more, further preferably 50 parts by mass or more, further preferably 55 parts by mass or more, and particularly preferably 60 parts by mass or more. Moreover, from a viewpoint of the heat generation property (20° C. tan δ), it is preferably 120 parts by mass or less, more preferably 110 parts by mass or less, further preferably 100 parts by mass or less, further preferably 90 parts by mass or less, further preferably 80 parts by mass or less, further preferably 75 parts by mass or less, further preferably 70 parts by mass or less, and particularly preferably 65 parts by mass or less.

(Carbon Black)

Carbon black is not particularly limited, and those common in the tire industry can be used, such as GPF, FEF, HAF, ISAF, SAF, and the like, or specifically, N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991, and the like can be suitably used, and, besides these, an in-house synthetic product and the like can also be suitably used. These carbon blacks may be used alone or two or more thereof may be used in combination.

A nitrogen adsorption specific surface area ($N_2SA$) of carbon black is preferably 50 $m^2$/g or more, more preferably 80 $m^2$/g or more, and further preferably 100 $m^2$/g or more, from viewpoints of weather resistance and reinforcing property. Moreover, it is preferably 250 $m^2$/g or less and more preferably 220 $m^2$/g or less, from viewpoints of dispersibility, the heat generation property, the breaking property, and durability. Besides, the $N_2SA$ of carbon black in the specification is a value measured in accordance with A Method under JIS K 6217-2 "Carbon black for rubber-Fundamental characteristics-Part 2: Determination of specific surface area-Nitrogen adsorption methods-Single-point procedures".

When the rubber composition comprises carbon black, the content thereof based on 100 parts by mass of the rubber component is, from a viewpoint of chipping resistance (TB and EB), preferably 1 parts by mass or more, more preferably 5 parts by mass or more, further preferably 8 parts by mass or more, and particularly preferably 10 parts by mass or more. Moreover, from a viewpoint of the heat generation property (20° C. tan δ), it is preferably 40 parts by mass or less, more preferably 35 parts by mass or less, further preferably 30 parts by mass or less, and particularly preferably 25 parts by mass or less.

(Other Fillers)

As fillers other than silica and carbon black, any filler commonly used in the tire industry conventionally, such as aluminum hydroxide, calcium carbonate, alumina, clay, talc, and the like can be compounded.

A content of silica in 100% by mass of the total of silica and carbon black is preferably 40% by mass or more, more preferably 50% by mass or more, further preferably 60% by mass or more, and particularly preferably 65% by mass or more. Moreover, the above-mentioned content of silica is preferably 99% by mass or less, more preferably 95% by mass or less, further preferably 90% by mass or less, and particularly preferably 85% by mass or less.

A total content of silica and carbon black based on 100 parts by mass of the rubber component is preferably 40 parts by mass or more, more preferably 50 parts by mass or more, further preferably 55 parts by mass or more, further preferably 60 parts by mass or more, further preferably 65 parts by mass or more, and particularly preferably 70 parts by mass or more, from a viewpoint of chipping resistance. Moreover, it is preferably 130 parts by mass or less, more preferably 120 parts by mass or less, further preferably 110 parts by mass or less, further preferably 100 parts by mass or less, further preferably 90 parts by mass or less, and particularly preferably 80 parts by mass or less, from a viewpoint of the heat generation property.

(Silane Coupling Agent)

Silica is preferably used in combination with a silane coupling agent. The silane coupling agent is not particularly limited, and examples of the silane coupling agent include, for example, a sulfide-based silane coupling agent such as bis(3-triethoxysilylpropyl)disulfide, bis(3-triethoxysilylpropyl)tetrasulfide, and the like; a mercapto-based silane coupling agent such as 3-mercaptopropyltrimethoxysilane, NXT-Z100, NXT-Z45, NXT, and the like, manufactured by Momentive Performance Materials; a vinyl-based silane coupling agent such as vinyltriethoxysilane, vinyltrimethoxysilane, and the like; an amino-based silane coupling agent such as 3-aminopropyltriethoxysilane, 3-aminopropyltrimethoxysilane, 3-(2-aminoethyl) aminopropyltriethoxysilane, and the like; a glycidoxy-based silane coupling agent such as γ-glycidoxypropyltriethoxysilane, γ-glycidoxypropyltrimethoxysilane, and the like; a nitro-based silane coupling agent such as 3-nitropropyltrimethoxysilane, 3-nitropropyltriethoxysilane, and the like, a chloro-based silane coupling agent such as 3-chloropropyltrimethoxysilane, 3-chloropropyltriethoxysilane, and the like, and the like, and a sulfide-based silane coupling agent is preferable. These silane coupling agents may be used alone or two or more thereof may be used in combination.

When the rubber composition comprises the silane coupling agent, the content thereof based on 100 parts by mass of silica is preferably 5 parts by mass or more, more preferably 6 parts by mass or more, further preferably 7 parts by mass or more, and particularly preferably 8 parts by mass or more, from a viewpoint of enhancing the dispersibility of silica. Moreover, it is preferably 18 parts by mass or less, more preferably 16 parts by mass or less, further preferably 14 parts by mass or less, and particularly preferably 12 parts by mass or less, from a viewpoint of preventing deterioration of abrasion resistance.

<Softeners>

The rubber composition for the tread according to the disclosure preferably comprises softeners. Examples of a softener include a resin component, oil, a liquid rubber, and the like, for example. 20° C. tan δ, TB, and EB of the rubber composition can be appropriately adjusted in accordance with a compounding amount of the softener described previously.

The resin component is not particularly limited, and examples thereof include a petroleum resin, a terpene-based resin, a rosin-based resin, a phenol-based resin, and the like being commonly used in the tire industry. These resin components may be used alone or two or more thereof may be used in combination.

In the specification, a "C5-based petroleum resin" refers to a resin obtained by polymerizing a C5 fraction. Examples of the C5 fraction include, for example, a petroleum fraction equivalent to 4 to 5 carbon atoms such as cyclopentadiene, pentene, pentadiene, isoprene, and the like. As the C5-based petroleum resin, a dicyclopentadiene resin (DCPD resin) is suitably used.

In the specification, an "aromatic-based petroleum resin" refers to a resin obtained by polymerizing a C9 fraction, and may be hydrogenated or modified. Examples of the C9 fraction include, for example, a petroleum fraction equivalent to 8 to 10 carbon atoms such as vinyltoluene, alkylstyrene, indene, methyl indene, and the like. As specific examples of the aromatic-based petroleum resin, for example, a coumarone indene resin, a coumarone resin, an indene resin, and an aromatic vinyl-based resin are suitably used. As the aromatic vinyl-based resin, a homopolymer of α-methylstyrene or styrene or a copolymer of α-methylstyrene and styrene is preferable, and a copolymer of α-methylstyrene and styrene is more preferable, because it is economical, easy to be processed, and good in the heat generation property. As the aromatic vinyl-based resin, for example, those commercially available from Kraton Corporation, Eastman Chemical Company, etc., can be used.

In the specification, a "C5C9-based petroleum resin" refers to a resin obtained by copolymerizing the C5 fraction and the C9 fraction, and may be hydrogenated or modified. Examples of the C5 fraction and the C9 fraction include the previously-described petroleum fractions. As the C5C9-based petroleum resin, for example, those commercially available from Tosoh Corporation, Zibo Luhua Hongjin New Material Co., Ltd., etc., can be used.

Examples of the terpene-based resin include a polyterpene resin consisting of at least one selected from terpene compounds such as α-pinene, β-pinene, limonene, dipentene, and the like, an aromatic-modified terpene resin made from the terpene compound and an aromatic compound; a terpene phenol resin made from a terpene compound and a phenol-based compound; and those obtainable by hydrogenating these terpene-based resins (hydrogenated terpene-based resins). Examples of the aromatic compound used as a raw material for the aromatic-modified terpene resin include, for example, styrene, α-methylstyrene, vinyltoluene, divinyltoluene, and the like. Examples of the phenol-based compound used as a raw material for the terpene phenol resin include, for example, phenol, bisphenol A, cresol, xylenol, and the like.

The rosin-based resin is not particularly limited, and examples thereof include, for example, a natural resin rosin, and a rosin modified resin being the natural resin rosin modified by hydrogenation, disproportionation, dimerization, or esterification.

The phenol-based resin is not particularly limited, and examples thereof include a phenolformaldehyde resin, an alkylphenolformaldehyde resin, an alkylphenol acetylene resin, an oil-modified phenolformaldehyde resin, and the like.

A softening point of the resin component is preferably 60° C. or higher, and more preferably 65° C. or higher, from a viewpoint of grip performance. Moreover, it is preferably 150° C. or lower, more preferably 140° C. or lower, and further preferably 130° C. or lower, from viewpoints of processability and improvement in dispersibility of a rubber component with a filler. Besides, in the specification, the softening point can be defined as a temperature at which a sphere drops when the softening point specified in JIS K 6220-1: 2001 is measured with a ring and ball softening point measuring device.

When the rubber composition comprises the resin component, the content thereof based on 100 parts by mass of the rubber component is, from a viewpoint of chipping resistance, preferably 1 parts by mass or more, more preferably 5 parts by mass or more, further preferably 10 parts by mass or more, and particularly preferably 12 parts by mass or more. Moreover, it is preferably 60 parts by mass or less, more preferably 50 parts by mass or less, further preferably 40 parts by mass or less, and particularly preferably 30 parts by mass or less, from a viewpoint of suppressing the heat generation property.

Examples of oil include, for example, a process oil, a vegetable oil and fat, an animal oil and fat, and the like. Examples of the previously-mentioned process oil include a paraffin-based process oil, a naphthene-based process oil, an aromatic-based process oil, and the like. Moreover, as an environmental measure, a process oil having a low content of a polycyclic aromatic compound (PCA) can also be used. Examples of the previously-mentioned process oil having a low content of a PCA include a mild extraction solution (MES), a treated distillate aromatic extract (TDAE), a heavy naphthene-based oil, and the like. These oils may be used alone or two or more thereof may be used in combination.

When the rubber composition comprises the oil, the content thereof based on 100 parts by mass of the rubber component is, from a viewpoint of chipping resistance, preferably 10 parts by mass or more, more preferably 15 parts by mass or more, and further preferably 20 parts by mass or more. Moreover, it is preferably 120 parts by mass or less, more preferably 110 parts by mass or less, further preferably 100 parts by mass or less, further preferably 80 parts by mass or less, further preferably 60 parts by mass or less, and particularly preferably 50 parts by mass or less from the viewpoint of abrasion resistance. Besides, in the specification, the content of oil also includes an amount of oil contained in an oil-extended rubber.

The liquid rubber is not particularly limited as long as it is a liquid polymer at room temperature (25° C.), and examples thereof include, for example, a liquid butadiene rubber (liquid BR), a liquid styrene-butadiene rubber (liquid SBR), a liquid isoprene rubber (liquid IR), a liquid styrene-isoprene rubber (liquid SIR), a liquid farnesene rubber, and the like. These liquid rubbers may be used alone or two or more thereof may be used in combination.

When the rubber composition comprises the liquid rubber, the content thereof based on 100 parts by mass of the rubber component is preferably 1 parts by mass or more, more preferably 2 parts by mass or more, further preferably 3 parts by mass or more, and particularly preferably 5 parts by mass or more. Moreover, the content of the liquid rubber is preferably 50 parts by mass or less, more preferably 40 parts by mass or less, and further preferably 20 parts by mass or less.

A content of the softener based on 100 parts by mass of the rubber component (a total content of all of the softener in a plurality when a combined use is made thereof) is, from a viewpoint of grip performance, preferably 20 parts by mass or more, more preferably 30 parts by mass or more, further preferably 40 parts by mass or more, and particularly preferably 50 parts by mass or more. Moreover, it is preferably 130 parts by mass or less, more preferably 120 parts by mass or less, further preferably 110 parts by mass or less, further preferably 100 parts by mass or less, further preferably 80 parts by mass or less, further preferably 70 parts by mass or less, and particularly preferably 60 parts by mass or less from a viewpoint of processability.

<Other Compounding Agents>

The rubber composition for the tread according to the disclosure can appropriately comprise compounding agents commonly used in the conventional tire industry, such as, for example, wax, processing aid, an antioxidant, stearic acid, zinc oxide, a vulcanizing agent, a vulcanization accelerator, and the like, in addition to the previously-described components.

When the rubber composition comprises the wax, the content thereof based on 100 parts by mass of the rubber component is, from a viewpoint of weather resistance of a rubber, preferably 0.5 parts by mass or more, and more preferably 1 parts by mass or more. Moreover, it is preferably 10 parts by mass or less, and more preferably 5 parts by mass or less, from a viewpoint of preventing whitening of a tire due to blooming.

Examples of processing aid include, for example, a fatty acid metal salt, a fatty acid amide, an amide ester, a silica surface active agent, a fatty acid ester, a mixture of a fatty acid metal salt and an amide ester, a mixture of a fatty acid metal salt and a fatty acid amide, and the like, and the processing aid comprising the fatty acid metal salt is preferable. These processing aids may be used alone or two or more thereof may be used in combination. As processing aid, for example, those commercially available from Schill+ Seilacher GmbH, Performance Additives, etc., can be used.

When the rubber composition comprises the processing aid, the content thereof based on 100 parts by mass of the rubber component is, from a viewpoint of exhibiting an effect of improving processability, preferably 0.5 parts by mass or more, more preferably 1.0 parts by mass or more, further preferably 1.5 parts by mass or more, and particularly preferably 2.0 parts by mass or more. Moreover, it is preferably 10 parts by mass or less, more preferably 8.0 parts by mass or less, further preferably 6.0 parts by mass or, and particularly preferably 4.0 parts by mass or less from the viewpoints of abrasion resistance and breaking strength.

The antioxidant is not particularly limited, and examples thereof include, for example, each amine-based, quinoline-based, quinone-based, phenol-based, and imidazole-based compound, and an antioxidant such as a carbamate metal salt, preferably a phenylenediamine-based antioxidant such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, and the like, and a quinoline-based antioxidant such as 2,2,4-trimethyl-1,2-dihydroquinoline polymer, 6-ethoxy-2,2,4-trimethyl-1,2-dihydroquinoline, and the like. These antioxidants may be used alone or two or more thereof may be used in combination.

When the rubber composition comprises the antioxidant, the content thereof is, from the viewpoint of ozone crack resistance of a rubber, preferably 0.5 parts by mass or more, more preferably 1.0 parts by mass or more, further preferably 1.5 parts by mass or more, further preferably 2.0 parts by mass or more, further preferably 2.5 parts by mass or more, and particularly preferably 3.1 parts by mass or more based on 100 parts by mass of the rubber component. Moreover, it is preferably 10 parts by mass or less, more preferably 8.0 parts by mass or less, and further preferably 5.0 parts by mass or more from the viewpoints of abrasion resistance and wet grip performance.

When the rubber composition comprises the stearic acid, the content thereof is, from the viewpoint of processability, preferably 0.5 parts by mass or more and more preferably 1 parts by mass or more based on 100 parts by mass of the rubber component. Moreover, it is preferably 10 parts by mass or less and more preferably 5 parts by mass or less, from the viewpoint of vulcanization rate.

When the rubber composition comprises the zinc oxide, the content thereof is, from the viewpoint of processability, preferably 0.5 parts by mass or more and more preferably 1 parts by mass or more based on 100 parts by mass of the rubber component. Moreover, it is preferably 10 parts by mass or less and more preferably 5 parts by mass or less, from the viewpoint of abrasion resistance.

Sulfur is appropriately used as the vulcanizing agent. As sulfur, a powdered sulfur, an oil-treated sulfur, a precipitated sulfur, a colloidal sulfur, an insoluble sulfur, a highly dispersible sulfur, and the like can be used.

A content of sulfur when compounded as the vulcanizing agent based on 100 parts by mass of the rubber component is, from the viewpoint of securing a sufficient vulcanization reaction, preferably 0.1 parts by mass or more, more preferably 0.3 parts by mass or more, and further preferably 0.5 parts by mass or more. Moreover, it is preferably 5.0 parts by mass or less, more preferably 4.0 parts by mass or less, and further preferably 3.0 parts by mass or less, from the viewpoint of preventing deterioration. Besides, a content of a vulcanizing agent when using an oil-containing sulfur as the vulcanizing agent shall be a total content of pure sulfur amounts comprised in the oil-containing sulfur.

Examples of vulcanizing agents other than sulfur include, for example, alkylphenol-sulfur chloride condensate, 1,6-hexamethylene-sodium dithiosulfate dehydrate, 1,6-bis(N,N'-dibenzylthiocarbamoyldithio)hexane, and the like. As these vulcanizing agents other than sulfur, those commercially available from Taoka Chemical Co., Ltd., LANXESS, Flexsys, etc. can be used.

Examples of vulcanization accelerators include, for example, sulfenamide-based, thiazole-based, thiuram-based, thiourea-based, guanidine-based, dithiocarbamic acid-based, aldehyde-amine-based or aldehyde-ammonia-based, imidazoline-based, xanthate-based vulcanization accelerators, and the like, although the vulcanization accelerators are not particularly limited thereto. Among them, sulfenamide-based vulcanization accelerators and guanidine-based vulcanization accelerators are preferable from a viewpoint that desired effects are suitably obtained.

Examples of the sulfenamide-based vulcanization accelerators include, for example, N-cyclohexyl-2-benzothiazolylsulfenamide (CBS), N-tert-butyl-2-benzothiazolylsulfenamide (TBBS), N-oxyethylene-2-benzothiazolylsulfenamide, N—N'-diisopropyl-2-benzothiazolylsulfenamide, N,N-dicyclohexyl-2-benzothiazolylsulfenamide, and the like. Examples of the thiazole-based vulcanization accelerators include, for example, 2-mercaptobenzothiazole, dibenzothiazolyl disulfide, and the like. Examples of the guanidine-based vulcanization accelerators include, for example, diphenylguanidine (DPG), di-o-tolylguanidine, o-tolylbiguanidine, and the like. These vulcanization accelerators may be used alone or two or more thereof may be used in combination.

When the rubber composition comprises the vulcanization accelerators, the content thereof based on 100 parts by mass of the rubber component is preferably 1.0 parts by mass or more and more preferably 1.5 parts by mass or more. Moreover, the content of the vulcanization accelerators based on 100 parts by mass of the rubber component is preferably 8 parts by mass or less, more preferably 7 parts by mass or less, and further preferably 6 parts by mass or less. When the content of the vulcanization accelerators is within the above-described ranges, there is a tendency to be able to secure breaking strength and elongation at break.

The rubber composition according to the disclosure can be manufactured by a known method. For example, it can be manufactured, using a known rubber kneading apparatus commonly used in the tire industry, such as a Bunbury mixer, a kneader, an open roll, and the like, by a method of kneading components other than the vulcanizing agents and the vulcanization accelerators of the above-described individual components, and then adding the vulcanizing agents and the vulcanization accelerators thereto, and further kneading and then vulcanizing them. For example, kneading is carried out at 80 to 170° C. for 1 to 30 minutes in the kneading step and vulcanizing is carried out at 30 to 190° C. for 3 to 20 minutes in the vulcanizing step.

In the specification, 20° C. tan δ is used as an index correlating with the heat generation property. The 20° C. tan δ in the specification indicates a loss tangent tan δ measured under conditions of a temperature of 20° C., an initial strain of 2%, a dynamic strain of 1%, and a frequency of 50 Hz. The 20° C. tan δ of the rubber composition according to the disclosure is, from a viewpoint of the heat generation property, 0.30 or less, preferably 0.25 or less, more preferably 0.20 or less, and further preferably 0.18 or less. On the other hand, from a viewpoint of wet grip performance, it is preferably 0.08 or more and more preferably 0.10 or more.

The TB in the specification indicates a breaking strength (tensile strength at rupture) measured under a condition of a tensile speed of 8.3 mm/second in an atmosphere of 175° C. in accordance with JIS K 6251. The breaking strength TB indicates a force (MPa) required to pull and break a specimen, so that a greater value of the TB shows a superior breaking resistance strength.

From a viewpoint of chipping resistance, the TB of the rubber composition according to the disclosure is preferably 5.5 MPa or more, more preferably 5.9 MPa or more, and further preferably 6.3 MPa or more. Moreover, an upper limit value of the TB is not particularly limited.

Moreover, the EB in the specification indicates an elongation at break (elongation at rupture) measured under a condition of a tensile speed of 8.3 mm/second in an atmosphere of 175° C. in accordance with JIS K 6251. The elongation at break EB indicates a percentage (%) of elongation when a specimen is pulled and broken, so that a greater value of the EB shows a superior strain resistance property.

From a viewpoint of chipping resistance, the EB of the rubber composition according to the disclosure is preferably 190% or more, more preferably 200% or more, and further preferably 205% or more. Moreover, an upper limit of the EB is not particularly limited.

In the specification, a relational expression TB×EB/2 is used as an index correlating with the chipping resistance. As a result of intensive studies in the disclosure, it has been found that the product of TB and EB measured under a high temperature of 175° C. is strongly correlated with chipping resistance of a tire comprising a tread part comprising a circumferential main groove having a bending part, and making TB×EB/2 to be within a specified range allows securing a good chipping resistance. TB×EB/2 is 600 or more, preferably 625, and more preferably 650 or more. Making TB×EB/2 to be within the above-mentioned range makes it possible to obtain a sufficient chipping resistance. Moreover, an upper limit of TB×EB is not particularly limited.

[Tire]

A tire according to the disclosure is what comprises a tread composed of the rubber composition for the tread, and is not particularly limited in the category thereof, and while it can be used as a tire for a passenger car, a tire for an SUV, a tire for a heavy load vehicle such as a truck, a bus, and the like, a tire for a two-wheeled automobile, a run flat tire, a non-pneumatic tire, and the like, it is preferably used as the tire for the heavy load vehicle. Moreover, the tire according to the disclosure is superior in chipping resistance, so that it is suitable for traveling on a bad road surface (an unpaved rough road surface).

A tire comprising a tread composed of the rubber composition for the tread can be manufactured by a usual method using the above-described rubber composition for the tread. That is, the tire can be manufactured by extruding unvulcanized rubber compositions compounded with each of the above-described components based on the rubber component as necessary into shapes of the tread, attaching them together with other tire members on a tire molding machine, and molding them by a usual method to form an unvulcanized tire, followed by heating and pressurizing this unvulcanized tire in a vulcanizing machine.

While FIG. 1 is one example of a development view in which a tread pattern of a tire according to one embodiment of the disclosure is developed on a flat surface, the disclosure is not limited thereto. In a tread 2 is formed a tread pattern in which an orientation of mounting to a vehicle is designated. The tread pattern of the tread part 2 is formed in an unsymmetrical shape with respect to a tire equator C.

The tread 2 has an outer tread end To and an inner tread end Ti. The outer tread end To is located outer to the vehicle (on the right in FIG. 1) at the time of mounting to the vehicle. The inner tread end Ti is located inner to the vehicle (on the left in FIG. 1) at the time of mounting to the vehicle.

Each of the tread ends To, Ti is a grounding position being outermost in a tire width direction W (a left-right direction in FIG. 1; below called merely the width direction W) when a normal load is applied to a tire in a normal state, which tire is grounded onto a flat surface at a camber angle of 0°. The normal state is a state in which a tire is rim assembled to a normal rim and filled with a normal internal pressure, and is, even more, a non-load state. In the specification, unless otherwise specified, dimensions and the like of each part of the tire have values measured in the normal state. In the normal state, a distance in the width direction W between the outer tread end To and the inner tread end Ti is defined as a tread width TW.

In a standard system including a standard on which the tire is based, the "normal rim" is a rim defined for each tire by the standard, and is a "standard rim" for JATMA, a "Design Rim" for TRA, or a "Measuring Rim" for ETRTO.

The "normal internal pressure" is an air pressure defined for each tire by each standard, in a standard system including a standard on which the tire is based, and is "a maximum air pressure" for JATMA, a maximum value described in the table "TIRE LOAD LIMITS AT VARIOUS COLD INFLATION PRESSURES" for TRA, or "INFLATION PRESSURE" for ETRTO.

The "normal load" is a load defined for each tire by each standard, in a standard system including a standard on which the tire is based, and is "a maximum load rating" for JATMA, a maximum value described in the table "TIRE LOAD LIMITS AT VARIOUS COLD INFLATION PRESSURES" for TRA, or "LOAD CAPACITY" for ETRTO.

The tread 2 has a pair of circumferential main grooves 3A, 3B extending continuously in a tire circumferential direction on both sides of the tire equator C in the tire width direction. In FIG. 1, the pair of circumferential main grooves 3A, 3B has a zigzag shape having an amplitude in the tire width direction. The circumferential main grooves 3A, 3B numbering four in total are provided. However, the number of circumferential main grooves is not particularly limited, so that it can be made to be, for example, two to five, preferably three to five, and more preferably four.

In FIG. 1, the center main groove 3A, and the paired shoulder main groove 3B continuously extending in the tire circumferential direction on a side of the center main groove 3A, which side is outer in the tire width direction. Moreover, a plurality of middle lateral grooves 5A connecting between the center main groove 3A and the shoulder main groove 3B, and a plurality of shoulder lateral grooves 5B connecting between the shoulder main groove 3B and the tread ends To, Ti are provided. In this way, in the tread part 2 of the disclosure are arranged a center land part 7 partitioned between the pair of center main grooves 3A, 3B, a pair of middle block columns 8R in which are separately arranged, in the tire circumferential direction, a plurality of middle blocks 8 partitioned by the center main groove 3A, the shoulder main groove 3B, and the middle lateral grooves 5A, and a pair of shoulder block columns 9R in which are separately arranged, in the tire circumferential direction, a plurality of shoulder blocks 9 partitioned by the shoulder main groove 3B, a grounding end Te, and the shoulder lateral grooves 5B.

A groove width of each of the circumferential main grooves 3A and 3B can be arbitrarily determined according to the common practice. To provide a sufficient drainage performance while maintaining the pattern rigidity of the tread 2, a groove width W1 (see FIG. 2) of each of the circumferential main grooves 3A, 3B is preferably approximately 2.5% to 5% of the tread width W, for example. A groove depth of each of the circumferential main grooves 3A, 3B is, from a viewpoint of the effect of the disclosure, preferably 6.0 to 12.0 mm, more preferably 7.0 to 11.0 mm, and further preferably 8.5 to 10.5 mm.

Figure 2:
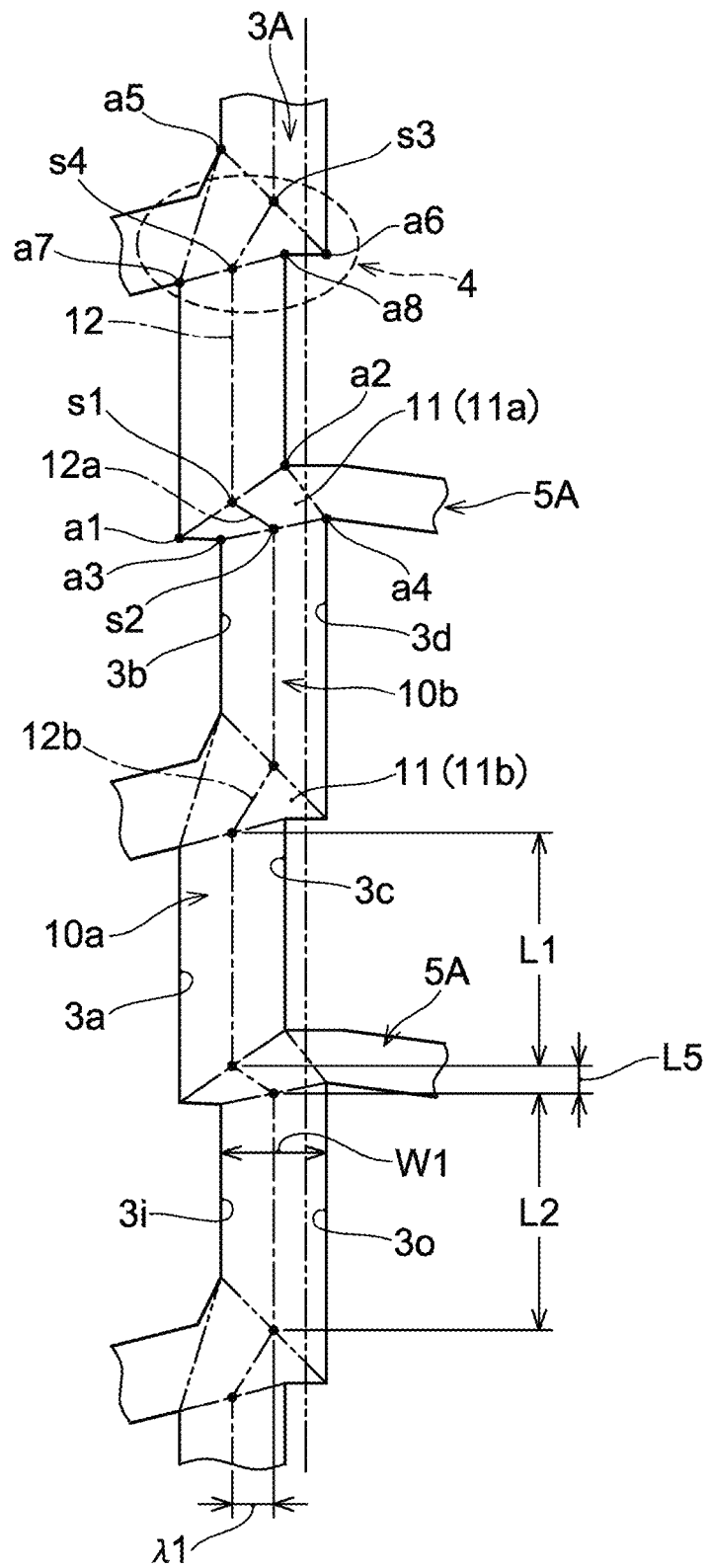
FIG. 2 is an enlarged view of a center main groove on the right in FIG. 1.

In FIG. 2 is shown an enlarged view of the center main groove 3A on the right in FIG. 1. As shown in FIG. 2, the center main groove 3A of the disclosure has a zigzag shape having a center inner part 10a extending linearly in the tire circumferential direction on a side being inner in the tire width direction, a center outer part 10b extending linearly in the tire circumferential direction on a side being outer to the center inner part 10a in the tire width direction, and a center connecting part 11 connecting the center inner part 10a and the center outer part 10b. The center main groove 3A as such comprises an edge component in the tire width direction, increasing the braking force. Moreover, the center main groove 3A having the center inner part 10a and the center outer part 10b has a large edge component in the tire circumferential direction, so that the revolving performance improves. Besides, the above-mentioned zigzag shape is not specifically limited to what is described previously, so that it can have, for example, a zigzag shape in which are alternately arranged a plurality of long side parts being inclined on one side with respect to the tire circumferential direction and a short side part connecting the long side parts neighboring in the tire circumferential direction and having a length in the tire circumferential direction, which length is smaller than that of the long side parts.

The center main groove 3A has an inner groove edge 3i extending in the tire circumferential direction on a side being inner in the tire width direction and an outer groove edge 3o extending in the tire circumferential direction on a side being outer in the tire width direction. The inner groove edge 3i comprises an inner-side inner edge 3a extending along the tire circumferential direction on a side being innermost in the tire width direction and an inner-side outer edge 3b extending along the tire circumferential direction on a side being outermost in the tire width direction. Moreover, the outer groove edge 3o comprises an outer-side inner edge 3c extending along the tire circumferential direction on a side being innermost in the tire width direction and an outer-side outer edge 3d extending along the tire circumferential direction on a side being outermost in the tire width direction.

In the disclosure, the center inner part 10a refers to a groove formed by the inner-side inner edge 3a and the outer-side inner edge 3c. Moreover, the center outer part 10b refers to a groove formed by the inner-side outer edge 3b and the outer-side outer edge 3d.

Moreover, the center connecting part 11 has a first center part 11a in which a groove center line 12a (shown in a single dot chain line) is inclined to one side in the tire width direction (inclined upward to the left in FIG. 2) and a second center part 11b in which a groove center line 12b is inclined to the other side in the tire width direction (inclined upward to the right in FIG. 2). In this way, in the center main groove 3A of the disclosure are continuously formed on one side in the tire circumferential direction the center inner part 10a, the first center part 11a, the center outer part 10b, and the second center part 11b. Besides, in FIG. 2, the center inner part 10a, the first center part 11a, the center outer part 10b, and the second center part 11b are shown with a virtual line.

The groove center line 12 of the center main groove 3A is formed by a straight line successively connecting an intermediate point s1 between one end a1 of the inner-side inner edge 3a and one end a2 of the outer-side inner edge 3c, an intermediate point s2 between another end a3 of the inner-side outer edge 3b and another end a4 of the outer-side outer edge 3d, an intermediate point s3 between one end a5 of the inner-side outer edge 3b and one end a6 of the outer-side outer edge 3d, and an intermediate point s4 between another end a7 of the inner-side inner edge 3a and another end a8 of the outer-side inner edge 3c.

As shown in FIG. 2, the groove center line 12 of the center main groove 3A has an amplitude $\lambda 1$. The amplitude $\lambda 1$ is a peak-to-peak amplitude of the groove main line 12 in the tire width direction. The amplitude $\lambda 1$ is preferably 2.0 mm or more, more preferably 2.5 mm or more, further preferably 3.0 mm or more, and particularly preferably 3.5 mm or more. Moreover, the amplitude $\lambda 1$ is preferably 20.0 mm or less, more preferably 15.0 mm or less, further preferably 10.0 mm or less, further preferably 8.0 mm or less, further preferably 6.0 mm or less, further preferably 5.0 mm or less, and particularly preferably 4.5 mm or less. Making the amplitude $\lambda 1$ of the groove center line to be within the above-mentioned range allows obtaining a large edge component in the tire width direction, so that the braking force improves.

A ratio of TB×EB to the amplitude $\lambda 1$ of the groove center line (TB×EB/$\lambda 1$) is preferably 50 or more, more preferably 100 or more, further preferably 150 or more, further preferably 200 or more, further preferably 250 or more, and particularly 300 or more. Chipping resistance and steering stability can be improved in a well-balanced manner by improving the tensile property of the tread rubber as $\lambda 1$ increases. On the other hand, while an upper limit value of TB×EB/$\lambda 1$ is not particularly limited, it can be made to be 1000 or less, 900 or less, 800 or less, 700 or less, or 600 or less, for example.

A value in which 20° C. tan δ of the rubber composition according to the disclosure is multiplied by the amplitude $\lambda 1$ of the groove center line (20° C. tan δ×$\lambda 1$) is preferably 4.0 or less, more preferably 2.5 or less, further preferably 2.0 or less, further preferably 1.5 or less, further preferably 1.2 or less, and particularly preferably 0.90 or less. Decreasing 20° C. tan δ as $\lambda 1$ increases makes it possible to further improve chipping resistance. On the other hand, 20° C. tan δ×$\lambda 1$ is, from viewpoints of wet grip performance and steering stability, preferably 0.20 or more, more preferably 0.25 or more, further preferably 0.30 or more, further preferably 0.35 or more, further preferably 0.40 or more, and particularly preferably 0.45 or more.

From a viewpoint of more effectively exhibiting the above-described operation, as shown in FIG. 2, a length L1 of the center inner potion 10a in the tire circumferential direction is preferably 80 to 120% of a length L2 of the center outer part 10b in the tire circumferential direction.

In a case that a length L5 of the center connecting part 11 in the tire circumferential direction is large, a snow column shear force could get small. In a case that the length L5 of the center connecting part 11 is small, the snow discharge performance of the center main groove 3A could deteriorate. Thus, the length L5 of the center connecting part 11 is preferably 10 to 40% of the length L1 of the center inner part 10a.

The shoulder block 9 can be provided with a shoulder fine groove 22 extending in the tire circumferential direction. In this way, the shoulder block 9 is partitioned into an outer piece 9A arranged between the shoulder fine groove 22 and the tread ends To, Ti, and an inner piece 9B arranged on a side of the tire equator C with respect to the outer piece 9A.

Providing the shoulder fine groove 22 as such increases the edge component in the tire circumferential direction, improving the revolving performance. Moreover, a large rigidity of the outer piece 9A and the inner piece 9B in the tire circumferential direction is secured, so that the traveling performance on a dry road improves. Besides, while the shoulder fine groove 22 extends linearly, it is not limited to such an aspect, so that it can extend in a wavy, sinusoidal, or zigzag shape, for example. A groove width W2 of the shoulder fine groove 22 is preferably 1.0% to 2.0% of the tread width TW, for example. The groove depth of the shoulder fine groove 22 is preferably 0.40 to 0.60 times the groove depth of the deepest part of the circumferential main grooves 3A, 3B, for example.

In the center land part 7, the middle block 8, the outer pierce 9A, and the inner piece 9B can be provided a sipe 25, one end or both ends of which sipe 25 opens to the circumferential main groove 3A, 3B or the shoulder fine groove 22, and extending at an angle of 0 to 30° with respect to the tire width direction. In particular, providing the sipe 25 in the center land part 7 causes deformation in an orientation to close the width at the time of grounding of the block edge of the center land part 7 in the tire circumferential direction, so that wall faces of neighboring sipes come into contact with and support each other, suppressing a decrease in the rigidity of the land part. Therefore, in the center land part 7, on which center land part 7 a high grounding pressure operates, which center land part 7 is difficult to drain, the sipe 25 increases the drainage performance and abrasion resistance in a well-balanced manner. Besides, while the sipe 25 extends linearly, it is not limited to such an aspect, so that it can extend in a wavy, sinusoidal, or zigzag shape, for example. Besides, in the specification, the "sipe" refers to a narrow notch having a width of 2.0 mm or less, preferably 0.5 to 1.5 mm.

At a bending part 4 in a plurality, the circumferential main groove of the disclosure can bend and extend in the tire circumferential direction such that a center line of the circumferential main groove deviates in the tire width direction (see FIGS. 2 and 3) or an extending direction of the center line of the circumferential main groove changes preceding and following the bending part (see FIG. 4), so that it is not limited to having the zigzag shape of FIG. 1. Besides, in the disclosure, the bending part is a predetermined region being bent at an acute angle to change the extending direction of the center line of the circumferential main groove extending in the circumferential direction or being curved and bent. The bending part 4 can be a part crossing a lateral groove traversing the circumferential main groove in the width direction. In a case that the bending part 4 is a part at which the circumferential main groove and the lateral groove cross, the lateral groove can extend in an inclined manner with respect to the width direction. Moreover, the groove width of the circumferential main groove can have a wide width or a narrow width with respect to or can have the same width as the lateral groove to be crossed. While the circumferential main groove of the disclosure is communicatively connected over the entire tire circumferential direction, in the circumferential main groove are present in a repeated manner discontinuous portions in a case that an arbitrary imaginary line (see a double dot chain line in FIGS. 2 to 4) extending linearly along the circumferential direction is assumed.

Figure 3:
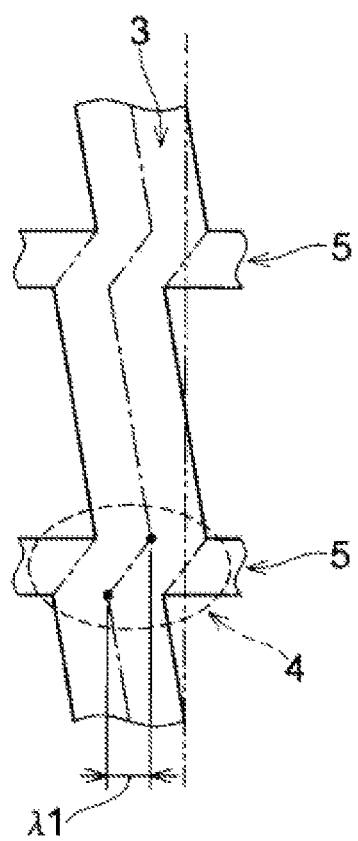
FIG. 3 is an enlarged view of a different circumferential main groove according to the disclosure.
Figure 4:
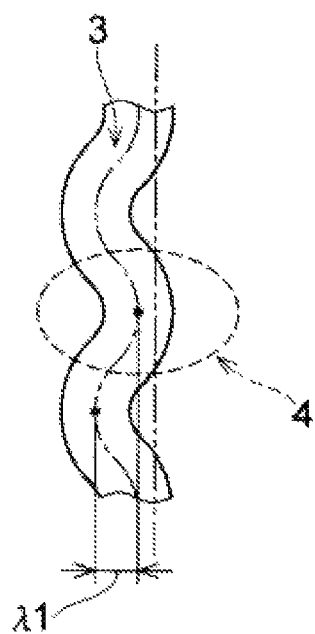
FIG. 4 is an enlarged view of a different circumferential main groove according to the disclosure.

In FIGS. 3 and 4 are shown enlarged views of different circumferential main grooves according to the disclosure. In FIG. 3, the circumferential main groove 3 extends in an inclined manner with respect to the tire circumferential direction, not extending linearly along the tire circumferential direction, and, at the bending part 4 of the circumferential main groove 3, a lateral groove 5 extends in a manner such that it crosses the circumferential main groove 3. In FIG. 4, the circumferential main groove 3 extends in a manner such that it is curved sinusoidally with respect to the tire circumferential direction. In either of the cases are present in a repeated manner discontinuous portions in a case that an arbitrary imaginary line extending linearly along the circumferential direction is assumed.

Example

Although the disclosure will be described below based on Examples, the disclosure is not limited only to these Examples.

Various chemicals used in Examples and Comparative examples are collectively shown below.

NR: TSR 20

SBR: Modified solution polymerized SBR (styrene content: 30% by mass, vinyl content: 52 mol %, Mw: 250,000, non-oil-extended product), manufactured in Manufacturing example 1 described below BR: UBEPOL BR (registered trademark) 150B (cis content: 97%, Mw: 440,000), manufactured by Ube Industries, Ltd.

Carbon black: Diablack N220 ($N_2SA$: 115 $m^2/g$), manufactured by Mitsubishi Chemical Corporation Silica 1: ULTRASIL (registered trademark) VN3 ($N_2SA$: 175 $m^2/g$, average primary particle size: 18 nm), manufactured by Evonik Degussa Silica 2: Zeosil (registered trademark) 1115MP ($N_2SA$: 115 $m^2/g$, average primary particle size: 25 nm), manufactured by Solvay Silica 3: ULTRASIL (registered trademark) 9100GR ($N_2SA$: 230 $m^2/g$, average primary particle size: 15 nm), manufactured by Evonik Degussa Silane coupling agent: Si266 (bis(3-triethoxysilylpropyl) disulfide), manufactured by Evonik Degussa Oil: VivaTec 400 (TDAE oil), manufactured by H&R Group Resin component: Petro Tac 100V (C5C9-based petroleum resin, softening point: 96° C.), manufactured by Tosoh Corporation Wax: OZOACE 0355, manufactured by Nippon Seiro Co., Ltd.

Antioxidant 1: NOCRACK 6C (N-(1,3-dimethylbutyl)-N'-phenyl-p-phenylenediamine)), manufactured by Ouchi Shinko Chemical Industrial Co., Ltd.

Antioxidant 2: NOCRACK RD (poly(2,2,4-trimethyl-1, 2-dihydroquinoline)), manufactured by Ouchi Shinko Chemical Industrial Co., Ltd.

Stearic acid: Bead stearic acid "Tsubaki", manufactured by NOF CORPORATION

Zinc oxide: Zinc oxide No. 1, manufactured by Mitsui Mining & Smelting Co., Ltd.

Processing aid 1: Ultra-Flow (registered trademark) 440 (Natural fatty acid zinc/metal soap), manufactured by Performance Additives Processing aid 2: Struktol WB16 (Mixture of fatty acid ester and fatty acid metal salt), manufactured by Schill+ Seilacher GmbH Sulfur: HK-200-5 (Powder sulfur containing 5% oil), manufactured by Hosoi Kagaku Kogyo Co., Ltd.

Vulcanization accelerator 1: Suncelar NS-G (N-tert-butyl-2-benzothiazolylsulfenamide (TBBS)), manufactured by Sanshin Kagaku Kogyo Co., Ltd.

Vulcanization accelerator 2: Nocceler D (1,3-diphenylguanidine (DPG)), manufactured by Ouchi Shinko Chemical Industrial Co., Ltd.

Manufacturing Example 1: Synthesis of Modified Solution Polymerized SBR

Cyclohexane, tetrahydrofuran, styrene, and 1,3-butadiene were charged into a nitrogen-substituted autoclave reactor. The temperature of the contents of the reactor was adjusted to 20° C., and then n-butyllithium was added to initiate polymerization. Polymerization was performed under an adiabatic condition, and the temperature reached 85° C. of the maximum temperature. When a polymerization conversion rate reached 99%, 1,3-butadiene was added, and after further polymerization for 5 minutes, N,N-bis(trimethylsilyl)-3-aminopropyltrimethoxysilane was added as a modifying agent to perform reaction. After completion of the polymerization reaction, 2,6-di-tert-butyl-p-cresol was added. Next, the mixed product was removed of solvent by steam stripping and dried by a heat roll which temperature was adjusted to 110° C. to obtain a modified solution polymerized SBR.

EXAMPLES AND COMPARATIVE EXAMPLES

According to the compounding formulations shown in Table 1, using a 1.7 L closed Banbury mixer, all chemicals other than sulfur and vulcanization accelerators were kneaded at a discharge temperature of 150 to 160° C. for 1 to 10 minutes to obtain a kneaded product. Next, using a double screw open roll, sulfur and vulcanization accelerators were added to the obtained kneaded product, and the mixture was kneaded for 4 minutes until reaching a temperature of 105° C. to obtain an unvulcanized rubber composition. The obtained unvulcanized rubber composition was press-vulcanized for 12 minutes at 170° C. to produce a test rubber composition.

Moreover, the obtained unvulcanized rubber composition was extruded into shapes of a tread with an extruder equipped with a mouthpiece having a predetermined shape and attached together with other tire members to produce an unvulcanized tire and then press-vulcanized for 12 minutes under a condition of 170° C. to produce a test tire (size: 195/65R15 91V, rim: 15×6.0 J, internal pressure: 240 kPa). Besides, each of individual test tires has a tread pattern shown in FIG. 1.

The following evaluation on the obtained test rubber composition and test tire was performed. An evaluation result is shown in Table 1.

<Viscoelasticity Test>

From a sheet-shaped vulcanized rubber composition, strip-shaped test pieces of 4 mm wide, 20 mm long, and 2 mm thick were punched out and subjected to testing. Using a spectrometer manufactured by Ueshima Seisakusho Co., Ltd., tan δ at 20° C. (20° C. tan δ) was measured under conditions of an initial strain of 2%, a dynamic strain of 1%, and a frequency of 50 Hz.

<Tensile Test>

A No. 3 dumbbell type test piece composed of individual vulcanized rubber compositions was produced, the produced No. 3 dumbbell type test piece was subjected to a tensile test under a condition of a tensile speed of 8.3 mm/second in an atmosphere of 175° C. in accordance with JIS K 6251: 2017 "Rubber, vulcanized or thermoplastics-Determination of tensile stress-strain properties", and breaking strength TB (MPa) and elongation at break EB (%) were measured.

<Chipping Resistance>

Each test tire was incorporated into a normal rim, filled with air to a normal internal pressure, and then mounted to a vehicle, and the vehicle was made to run on an uneven ground at a speed of 60 km/hour for 4 hours. After the running, for all cracks generated on the surface of the tire, the length thereof in the circumferential direction was measured, and the maximum circumferential length value was determined for each tire. The result was displayed as an index with the Comparative example 3 as 100. The result shows that the greater the index, the smaller the crack and the better the chipping resistance when travelling on a bad road at a high speed. The index was calculated by the following equation.

(Chipping resistance index)=(the length of the crack in the circumferential direction in Comparative example 3)/(the length of the crack in the circumferential direction for each compounding example)×100

Performing the above-described individual tests based on the compounding formulations in Table 1 allows obtaining each index or a value close thereto.

TABLE 1

| | Comparative example | | | | |
| --- | --- | --- | --- | --- | --- |
| | 1 | 2 | 3 | 4 | 5 |
| | Compounding amount (part by mass) | | | | |
| NR | 15 | 15 | 15 | 15 | 15 |
| SBR | 50 | 50 | 50 | 50 | 50 |
| BR | 35 | 35 | 35 | 35 | 35 |
| Carbon black 1 | 15 | 15 | 15 | 15 | 15 |
| Silica 1 | — | — | 50 | 70 | — |
| Silica 2 | 50 | 70 | — | — | — |
| Silica 3 | — | — | — | — | 70 |
| Silane coupling agent | 3.0 | 4.2 | 4.0 | 5.6 | 7.0 |
| Oil | 25 | 25 | 25 | 25 | 25 |
| Resin component | — | — | — | — | — |
| Wax | 1.8 | 1.8 | 1.8 | 1.8 | 1.8 |
| Antioxidant 1 | 2.2 | 2.2 | 2.2 | 2.2 | 2.2 |
| Antioxidant 2 | 0.9 | 0.9 | 0.9 | 0.9 | 0.9 |
| Stearic acid | 2.5 | 2.5 | 2.5 | 2.5 | 2.5 |
| Zinc oxide | 2.0 | 2.0 | 2.0 | 2.0 | 2.0 |
| Processing aid 1 | 1.0 | 1.0 | 1.0 | 1.0 | 1.0 |
| Processing aid 2 | 1.0 | 1.0 | 1.0 | 1.0 | 1.0 |
| Sulfur | 1.3 | 1.3 | 1.3 | 1.3 | 1.3 |

TABLE 1-continued

|  | | | | | |
|---|---|---|---|---|---|
| Vulcanization accelerator 1 | 1.5 | 1.5 | 1.5 | 1.5 | 1.5 |
| Vulcanization accelerator 2 | 1.0 | 1.0 | 1.0 | 1.0 | 1.0 |

| | Comparative example | | | | |
|---|---|---|---|---|---|
| | 1 | 2 | 3 | 4 | 5 |
| 20° C. tan δ | 0.16 | 0.20 | 0.16 | 0.21 | 0.20 |
| TB (MPa) | 5.4 | 5.2 | 5.8 | 5.7 | 5.8 |
| EB (%) | 177 | 167 | 188 | 184 | 186 |
| TB × EB/2 | 478 | 434 | 545 | 524 | 539 |
| Depth of main groove (mm) | 9.0 | 9.0 | 9.0 | 9.0 | 9.0 |
| λ1 (mm) | 4.0 | 4.0 | 4.0 | 4.0 | 4.0 |
| TB × EB/λ1 | 239 | 217 | 273 | 262 | 270 |
| 20° C. tan δ × λ1 | 0.64 | 0.80 | 0.64 | 0.84 | 0.80 |
| Chipping resistance | 88 | 78 | 100 | 95 | 98 |

| | Example | | | | | | | | | |
|---|---|---|---|---|---|---|---|---|---|---|
| | 1 | 2 | 3 | 4 | 5 | 6 | 7 | 8 | 9 | 10 |
| | Compounding amount (part by mass) | | | | | | | | | |
| NR | 15 | 15 | 15 | 15 | 10 | 50 | 70 | 15 | 15 | 15 |
| SBR | 50 | 50 | 50 | 50 | 70 | 30 | 30 | 50 | 50 | 50 |
| BR | 35 | 35 | 35 | 35 | 20 | 20 | — | 35 | 35 | 35 |
| Carbon black 1 | 15 | 15 | 15 | 20 | 15 | 15 | 15 | 15 | 20 | 15 |
| Silica 1 | — | — | — | — | — | — | — | — | — | — |
| Silica 2 | — | — | — | — | — | — | — | — | — | — |
| Silica 3 | 40 | 50 | 60 | 35 | 40 | 60 | 60 | 40 | 40 | 60 |
| Silane coupling agent | 4.0 | 5.0 | 6.0 | 3.5 | 4.0 | 6.0 | 6.0 | 4.0 | 4.0 | 6.0 |
| Oil | 25 | 25 | 25 | 25 | 25 | 25 | 25 | 40 | 25 | 25 |
| Resin component | — | — | — | — | — | — | — | — | 5.0 | — |
| Wax | 1.8 | 1.8 | 1.8 | 1.8 | 1.8 | 1.8 | 1.8 | 1.8 | 1.8 | 1.8 |
| Antioxidant 1 | 2.2 | 2.2 | 2.2 | 2.2 | 2.2 | 2.2 | 2.2 | 2.2 | 2.2 | 2.2 |
| Antioxidant 2 | 0.9 | 0.9 | 0.9 | 0.9 | 0.9 | 0.9 | 0.9 | 0.9 | 0.9 | 0.9 |
| Stearic acid | 2.5 | 2.5 | 2.5 | 2.5 | 2.5 | 2.5 | 2.5 | 2.5 | 2.5 | 2.5 |
| Zinc oxide | 2.0 | 2.0 | 2.0 | 2.0 | 2.0 | 2.0 | 2.0 | 2.0 | 2.0 | 2.0 |
| Processing aid 1 | 1.0 | 1.0 | 1.0 | 1.0 | 1.0 | 1.0 | 1.0 | 1.0 | 1.0 | 1.0 |
| Processing aid 2 | 1.0 | 1.0 | 1.0 | 1.0 | 1.0 | 1.0 | 1.0 | 1.0 | 1.0 | 1.0 |
| Sulfur | 1.3 | 1.3 | 1.3 | 1.3 | 1.3 | 1.3 | 1.3 | 1.3 | 1.3 | 1.3 |
| Vulcanization accelerator 1 | 1.5 | 1.5 | 1.5 | 1.5 | 1.5 | 1.5 | 1.5 | 1.5 | 1.5 | 1.5 |
| Vulcanization accelerator 2 | 1.0 | 1.0 | 1.0 | 1.0 | 1.0 | 1.0 | 1.0 | 1.0 | 1.0 | 1.0 |

| | Example | | | | | | | | | |
|---|---|---|---|---|---|---|---|---|---|---|
| | 1 | 2 | 3 | 4 | 5 | 6 | 7 | 8 | 9 | 10 |
| 20° C. tan δ | 0.15 | 0.16 | 0.17 | 0.13 | 0.17 | 0.15 | 0.17 | 0.13 | 0.18 | 0.17 |
| TB (MPa) | 6.5 | 6.6 | 6.8 | 6.6 | 6.3 | 7.5 | 8.1 | 7.1 | 6.9 | 6.8 |
| EB (%) | 211 | 213 | 220 | 214 | 205 | 243 | 260 | 229 | 223 | 220 |
| TB × EB/2 | 686 | 703 | 748 | 706 | 646 | 911 | 1053 | 813 | 769 | 748 |
| Depth of main groove (mm) | 9.0 | 9.0 | 9.0 | 9.0 | 9.0 | 9.0 | 9.0 | 9.0 | 9.0 | 9.0 |
| λ1 (mm) | 4.0 | 4.0 | 4.0 | 4.0 | 4.0 | 4.0 | 4.0 | 4.0 | 4.0 | 3.5 |
| TB × EB/λ1 | 343 | 351 | 374 | 353 | 323 | 456 | 527 | 406 | 385 | 427 |
| 20° C. tan δ × λ1 | 0.60 | 0.64 | 0.68 | 0.52 | 0.68 | 0.60 | 0.68 | 0.52 | 0.72 | 0.68 |
| Chipping resistance | 101 | 102 | 110 | 104 | 102 | 116 | 120 | 102 | 104 | 109 |

Based on the result in Table 1, it is evident that, in a tire of the disclosure, which tire comprises a tread part comprising a circumferential main groove having a bending part, wherein loss tangent tan δ, breaking strength, and elongation at break of a rubber composition forming a tread is made to be within a predetermined range, chipping resistance of the tire when it travels on a bad road at a high speed is improved.

EMBODIMENTS

An example of embodiments of the disclosure is shown below:

[1] A tire comprising a tread composed of a rubber composition comprising a rubber component, wherein the tread has a circumferential main groove extending continuously in a tire circumferential direction, the circumferential main groove being in one or a plurality, wherein, at a bending part in a plurality, the circumferential main groove bends and extends in the tire circumferential direction such that a center line of the circumferential main groove deviates in a tire width direction or an extending direction of the center line of the circumferential main groove changes preceding and following the bending part, and wherein the rubber composition has tan δ at 20° C. (20° C. tan δ) of 0.30 or less, and breaking strength TB (MPa) at 175° C. and elongation at break EB (%) at 175° C. satisfying a relational expression of TB×EB/2≥600.

[2] The tire of [1] above, wherein the circumferential main groove has a zigzag shape having an amplitude in the tire width direction.

[3] The tire of [1] or [2] above, wherein a depth of the circumferential main groove is 6.0 to 12.0 mm (preferably 7.0 to 11.0 mm and more preferably 8.5 to 10.5 mm).

[4] The tire of any one of [1] to [3] above, wherein a peak-to-peak amplitude λ1 in the tire width direction of a groove center line of the circumferential main groove is 2.0 to 20.0 mm (preferably 2.5 to 5.0 mm, preferably 3.0 to 5.0 mm, and particularly preferably 3.5 to 4.5 mm).

[5] The tire of [4] above, wherein TB×EB/λ1≥50 (preferably TB×EB/λ1≥100, more preferably TB×EB/λ1≥150, further preferably TB×EB/λ1≥200, further preferably TB×EB/λ1≥250, and particularly preferably TB×EB/λ1≥2 300).

[6] The tire of [4] or [5] above, wherein 20° C. tan δ×λ1≤4.0 (preferably 20° C. tan δ×λ1≤2.5, more preferably 20° C. tan δ×λ1≤2.0, further preferably 20° C. tan δ×λ1≤1.5, further preferably 20° C. tan δ×λ1≤1.2, and particularly preferably 20° C. tan δ×λ1≤0.90).

[7] The tire of [1] to [6] above, wherein the tread has three to five of the circumferential main grooves.

[8] The tire of any one of [1] to [7] above, wherein 20° C. tan δ of the rubber composition is 0.25 or less.

[9] The tire of any one of [1] to [8] above, wherein 20° C. tan δ of the rubber composition is 0.20 or less.

[10] The tire of any one of [1] to [9] above, wherein TB×EB/2≥625.

[11] The tire of any one of [1] to [10] above, wherein TB×EB/2≥650.

[12] The tire of any one of [1] to [11] above, wherein the rubber composition comprises silica having an average particle diameter of 17 nm or less (preferably 16 nm or less and more preferably 15 nm or less).

[13] The tire of any one of [1] to [12] above, wherein the rubber composition comprises 10% by mass or more of an isoprene-based rubber in the rubber component.

[14] The tire of any one of [1] to [13] above, wherein the rubber composition comprises 25 parts by mass or more, (preferably 35 to 120 parts by mass, more preferably 50 to 100 parts by mass, and further preferably 60 to 90 parts by mass) of silica having an average particle diameter of 17 nm or less (preferably 16 nm or less and more preferably 15 nm or less) based on 100 parts by mass of the rubber component comprising 10% by mass or more (preferably 10 to 80% by mass, more preferably 12 to 75% by mass, and further preferably 15 to 70% by mass) of an isoprene-based rubber and 20% by mass or more (preferably 20 to 80% by mass, more preferably 25 to 75% by mass, and further preferably 30 to 70% by mass) of a styrene-butadiene rubber.

REFERENCE SIGNS LIST

2 Tread
3 Circumferential main groove
3A Center main groove
3B Shoulder main groove
4 Bending part
5 Lateral groove
5A Middle lateral groove
5B Shoulder lateral groove
7 Center land part
8 Middle block
8R Middle block column
9 Shoulder block
9R Shoulder block column
9A Outer piece
9B Inner piece
22 Shoulder fine groove
25 Sipe
C Tire circumferential direction
To Outer tread end
Ti Inner tread end
TW Tread width
W Tire width direction

The invention claimed is:

1. A tire comprising a tread composed of a rubber composition comprising a rubber component,
wherein the tread has a circumferential main groove extending continuously in a tire circumferential direction, the circumferential main groove being in one or a plurality,
wherein, at a bending part in a plurality, the circumferential main groove bends and extends in the tire circumferential direction such that a center line of the circumferential main groove deviates in a tire width direction or an extending direction of the center line of the circumferential main groove changes preceding and following the bending part,
wherein a peak-to-peak amplitude λ1 in the tire width direction of a groove center line of the circumferential main groove is 2.0 mm or more and 6.0 mm or less,
wherein the rubber composition has tan δ at 20° C. (20° C. tan δ) of 0.30 or less, and breaking strength TB (MPa) at 175° C. and elongation at break EB (%) at 175° C. satisfying a relational expression of $TB \times EB/2 \geq 600$, wherein TB×EB/λ1 is 50 to 600, and
wherein the rubber composition comprises 25 parts by mass or more of silica, based on 100 parts by mass of the rubber component.

2. The tire of claim 1, wherein the circumferential main groove has a zigzag shape having an amplitude in the tire width direction.

3. The tire of claim 1, wherein a depth of the circumferential main groove is 6.0 to 12.0 mm.

4. The tire of claim 1, wherein a peak-to-peak amplitude λ1 in the tire width direction of a groove center line of the circumferential main groove is 2.5 to 5.0 mm.

5. The tire of claim 1, wherein 20° C. tan δ×λ1≤4.0.

6. The tire of claim 1, wherein the tread has three to five of the circumferential main grooves.

7. The tire of claim 1, wherein 20° C. tan δ of the rubber composition is 0.25 or less.

8. The tire of claim 1, wherein 20° C. tan δ of the rubber composition is 0.20 or less.

9. The tire of claim 1, wherein TB×EB/2≥625.

10. The tire of claim 1, wherein TB×EB/2≥650.

11. The tire of claim 1, wherein the rubber composition comprises silica having an average particle diameter of 17 nm or less.

12. The tire of claim 1, wherein the rubber composition comprises 10% by mass or more of an isoprene-based rubber in the rubber component.

13. The tire of claim 1, wherein the rubber composition comprises 25 parts by mass or more of silica having an average particle diameter of 17 nm or less, based on 100 parts by mass of the rubber component comprising 10% by mass or more of an isoprene-based rubber and 20% by mass or more of a styrene-butadiene rubber.

14. The tire of claim 1, wherein the rubber component comprises 10 to 80% by mass of an isoprene-based rubber and 20% by mass or more of a styrene-butadiene rubber.

15. The tire of claim 1, wherein the rubber composition comprises 1 to 40 parts by mass of carbon black, based on 100 parts by mass of the rubber component.

16. The tire of claim 1, wherein the rubber composition comprises 10 parts by mass or more of oil, based on 100 parts by mass of the rubber component.

17. A tire comprising a tread composed of a rubber composition comprising a rubber component,
wherein the rubber component comprises an isoprene-based rubber,
wherein the isoprene-based rubber is at least one selected from the group consisting of natural rubber and isoprene rubber (IR),
wherein the tread has a circumferential main groove extending continuously in a tire circumferential direction, the circumferential main groove being in one or a plurality,
wherein, at a bending part in a plurality, the circumferential main groove bends and extends in the tire circumferential direction such that a center line of the circumferential main groove deviates in a tire width direction or an extending direction of the center line of the circumferential main groove changes preceding and following the bending part,
wherein a peak-to-peak amplitude λ1 in the tire width direction of a groove center line of the circumferential main groove is 2.0 mm or more,
wherein the rubber composition has tan δ at 20° C. (20° C. tan δ) of 0.30 or less, and breaking strength TB (MPa) at 175° C. and elongation at break EB (%) at 175° C. satisfying a relational expression of $$TB \times EB/2 \geq 600,$$

wherein TB×EB/λ1 50 to 600, and
wherein the rubber component only consists of the isoprene-based rubber, a styrene-butadiene rubber, and a butadiene rubber, or only consists of the isoprene-based rubber and a styrene-butadiene rubber.

18. The tire of claim 17, wherein the rubber component comprises 10 to 75% by mass of the isoprene-based rubber and 25 to 80% by mass of a styrene-butadiene rubber.

* * * * *